W. F. ZIMMERMANN.
RACK CUTTING MACHINE.
APPLICATION FILED OCT. 6, 1908.

1,033,144. Patented July 23, 1912.

7 SHEETS—SHEET 3.

WITNESSES:
Benjamin Kittinger
Joseph Beer

INVENTOR
William F. Zimmermann

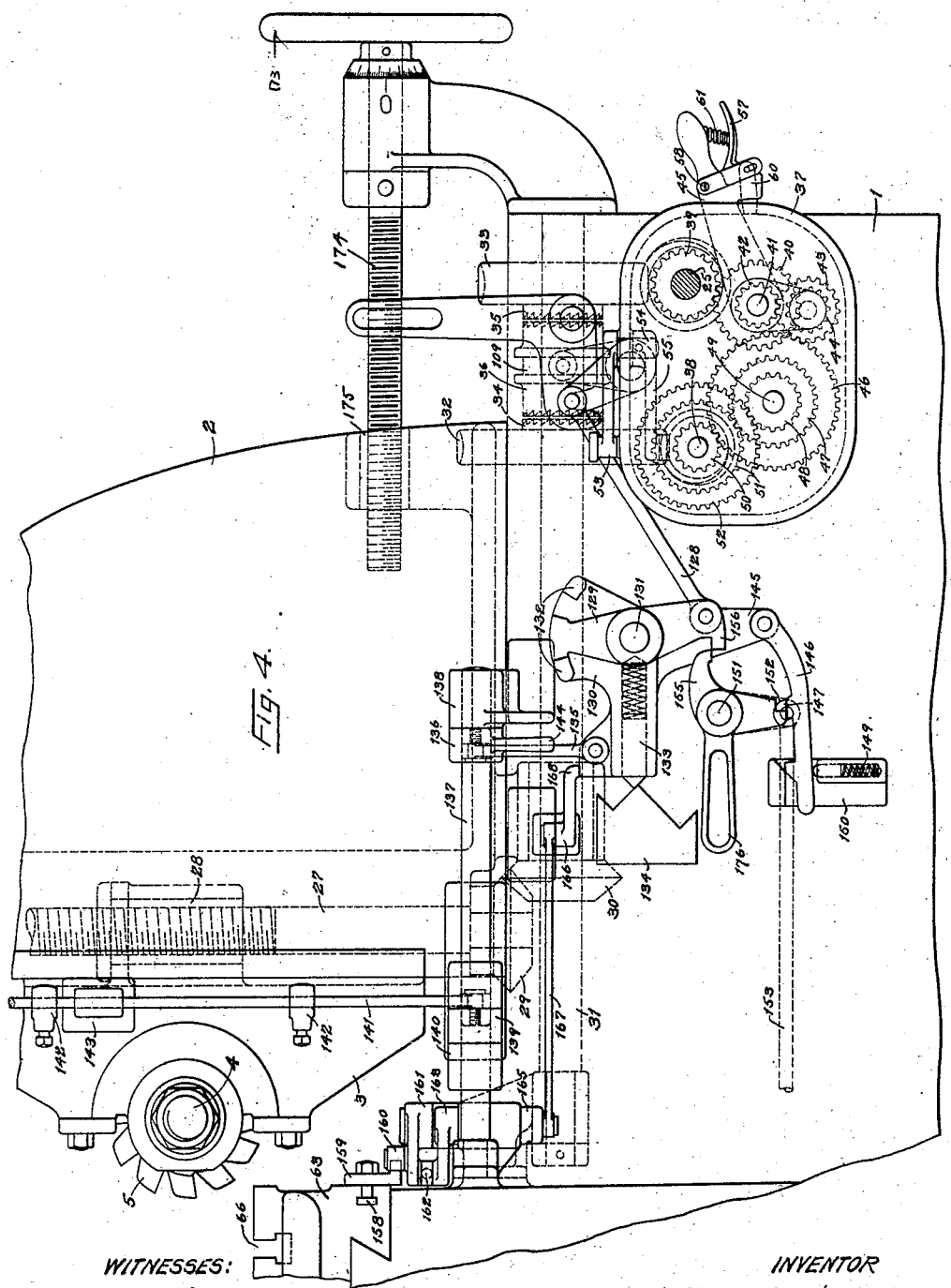

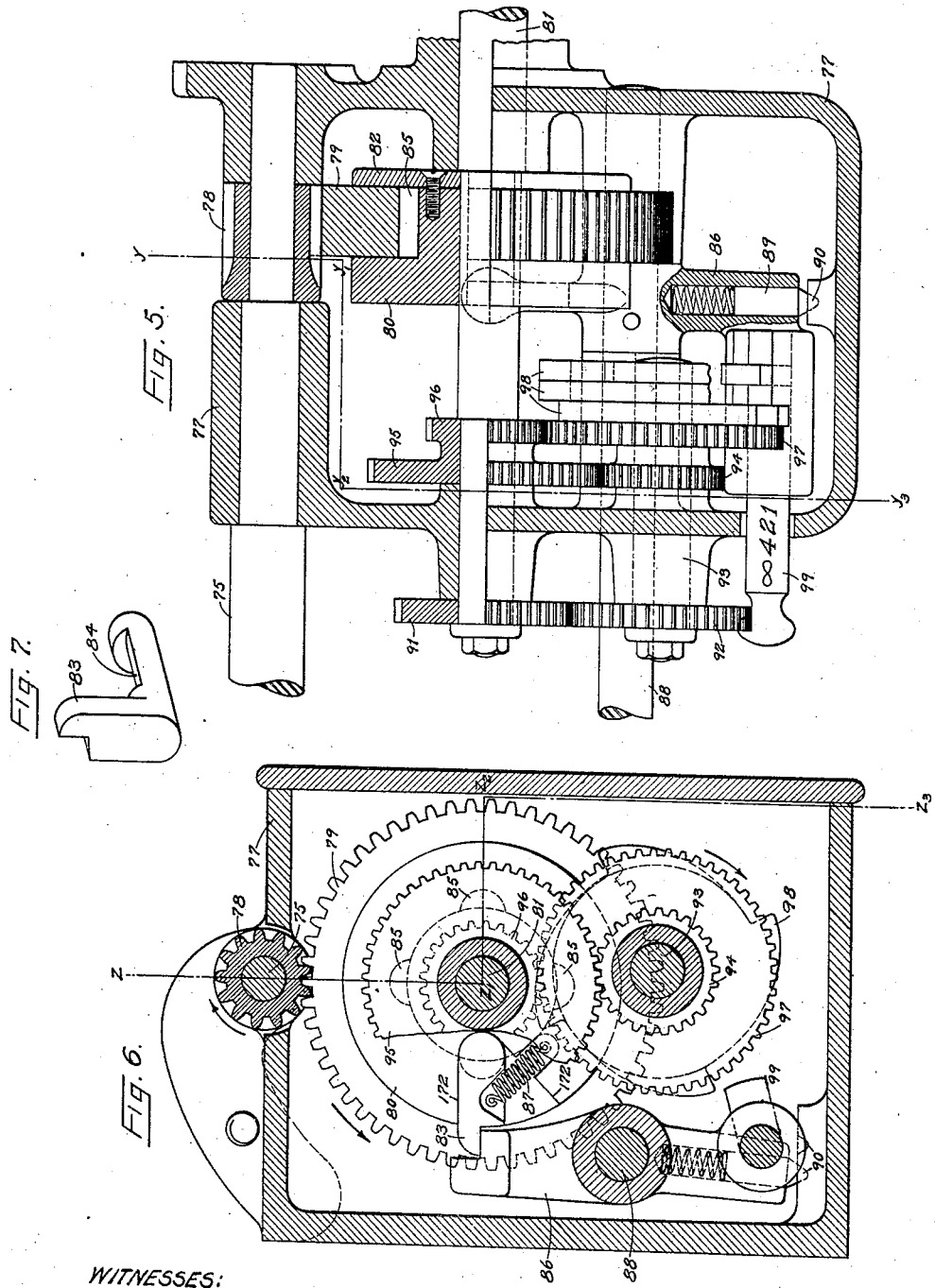

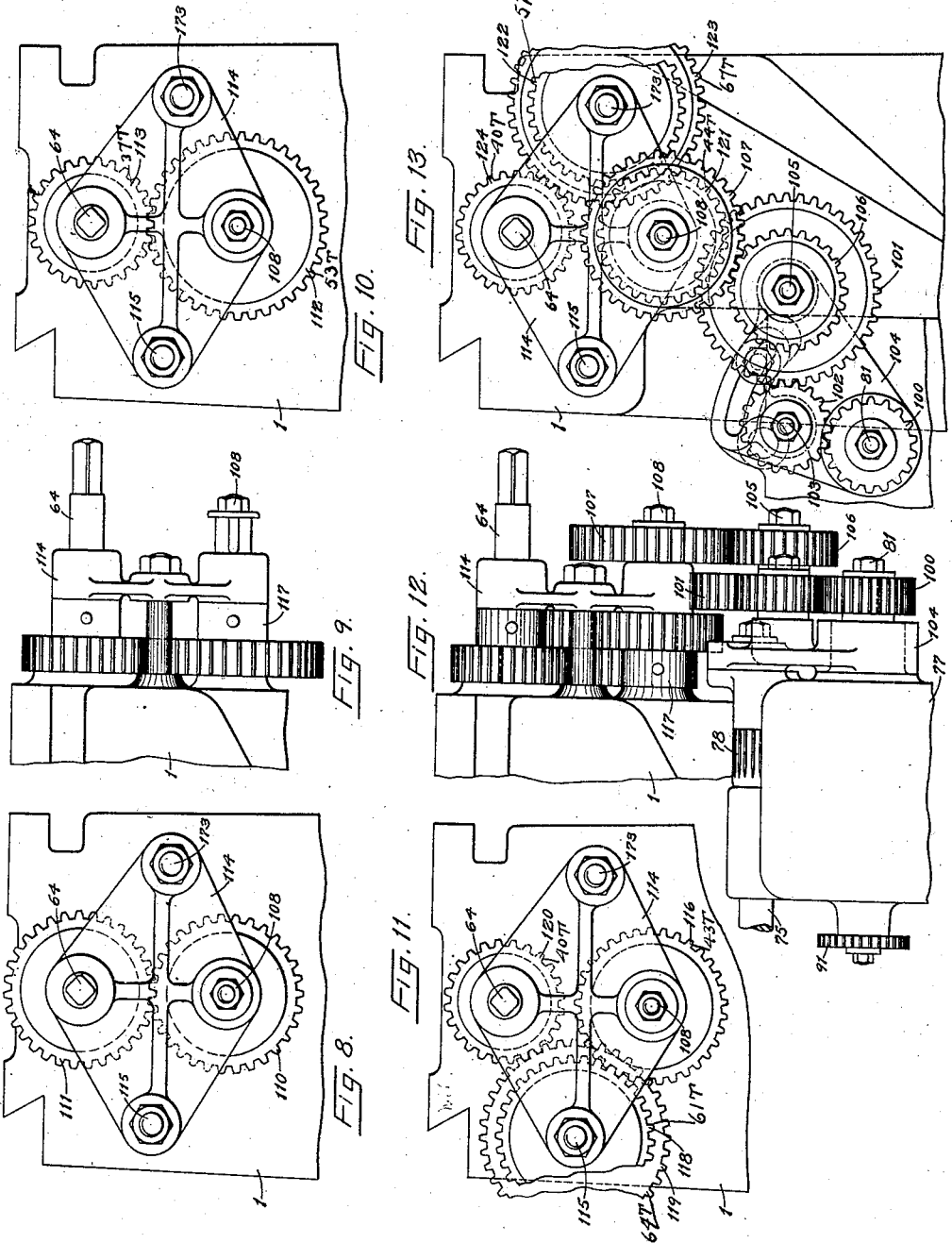

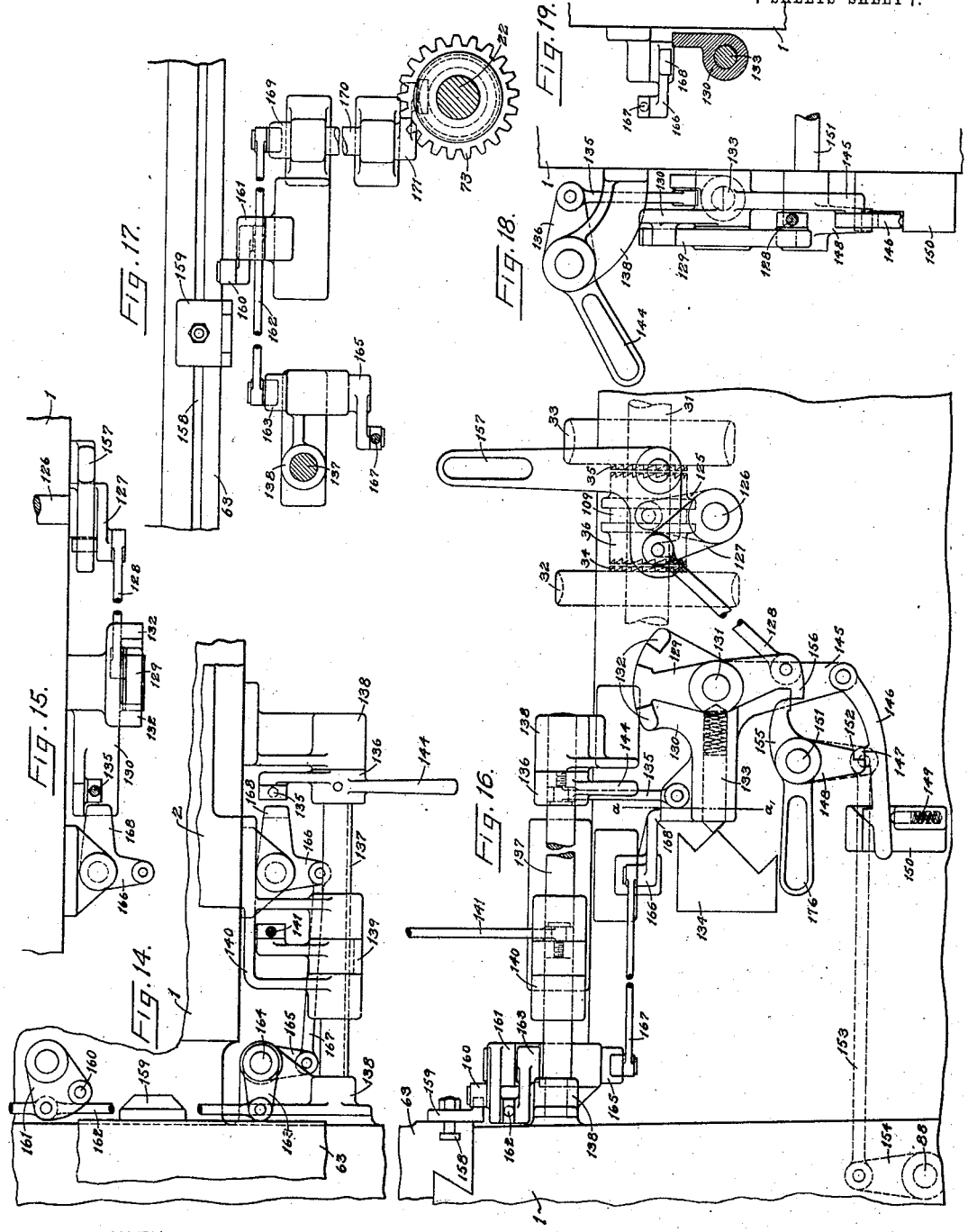

UNITED STATES PATENT OFFICE.

WILLIAM F. ZIMMERMANN, OF NEWARK, NEW JERSEY, ASSIGNOR TO GOULD & EBERHARDT, OF NEWARK, NEW JERSEY, A CORPORATION OF NEW JERSEY.

RACK-CUTTING MACHINE.

1,033,144.    Specification of Letters Patent.    Patented July 23, 1912.

Application filed October 6, 1908. Serial No. 456,388.

*To all whom it may concern:*

Be it known that I, WILLIAM F. ZIMMERMANN, a citizen of the United States, residing at Newark, in the county of Essex and State of New Jersey, have invented certain new and useful Improvements in Rack-Cutting Machines, of which the following is a specification.

The invention relates to machines for automatically cutting the teeth of racks with one or more formed disk cutters.

The primary object of the invention is to provide a machine of simple construction to efficiently perform the necessary functions whereby the teeth of racks may be automatically cut, both accurately and rapidly.

One feature of the invention relates to a novel feed changing device to rapidly and conveniently change the feeds of the cutter. For this particular feature a separate application has been filed June 7, 1907, Serial No. 377,711.

Another feature is the indexing mechanism, by means of which it is possible to obtain very accurate spacing of the teeth for any number of cutters within the range of the machine. For this feature there has been a patent granted January 5, 1909, No. 909,126.

A further novel feature relates to an arrangement to readily cut diametral, circular, module or millimeter pitches with only one pitch index screw. It has heretofore been the practice to provide two or more screws to cut the above recited pitches.

Other features relate to the novel arrangement of levers, whereby every motion of the machine is automatically controlled and interlocked, and which also provide for an automatic stop whereby the feeding of the cutter and the indexing can be automatically disconnected at any predetermined point upon the rack.

The various features of this invention will be best understood from the detailed description thereof, reference being had to the accompanying drawings which illustrate the embodiment of the above said features in their preferred form, and more particularly pointed out in the claims herewith appended.

Figure 1:
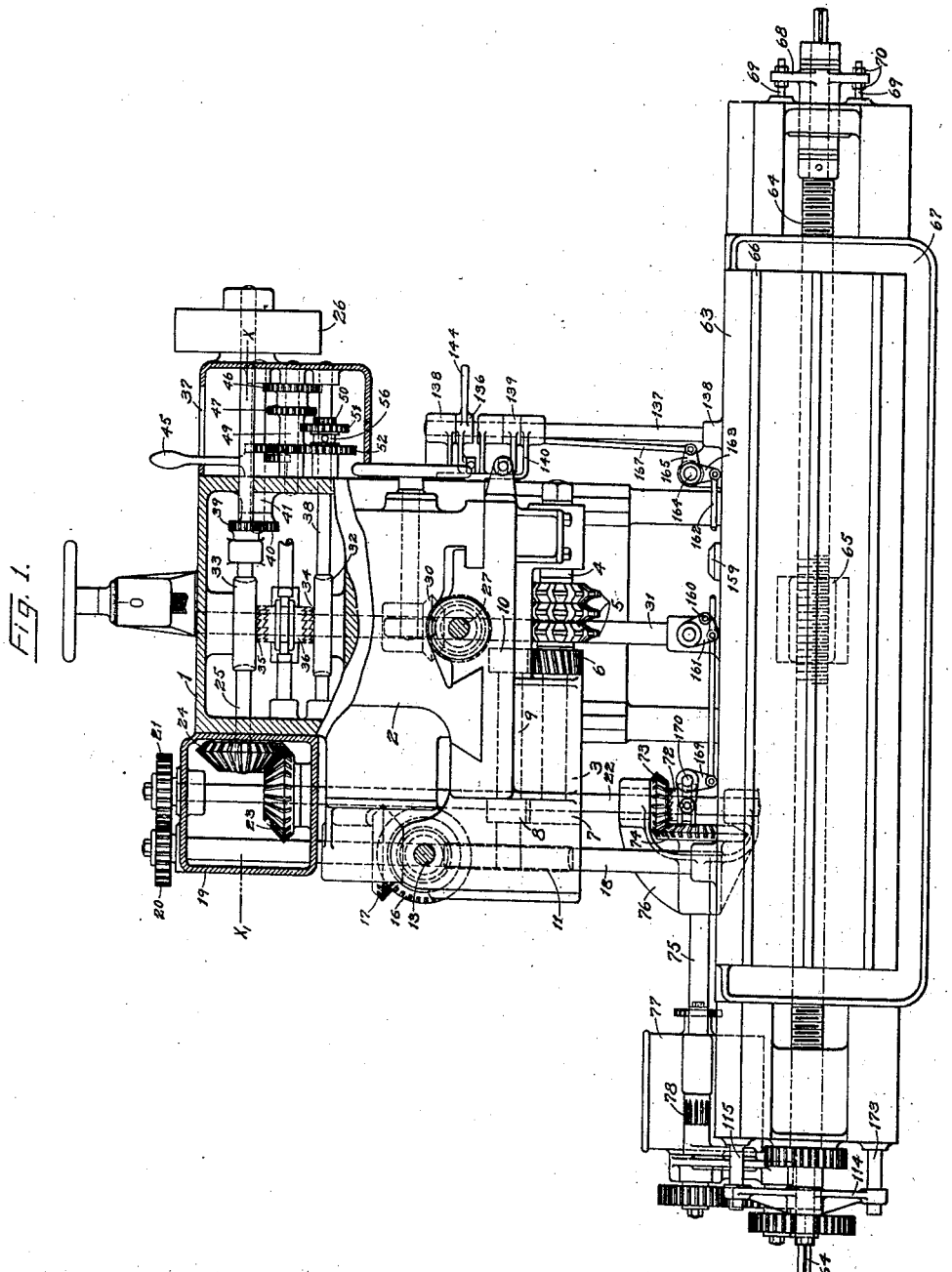
Figure 2:
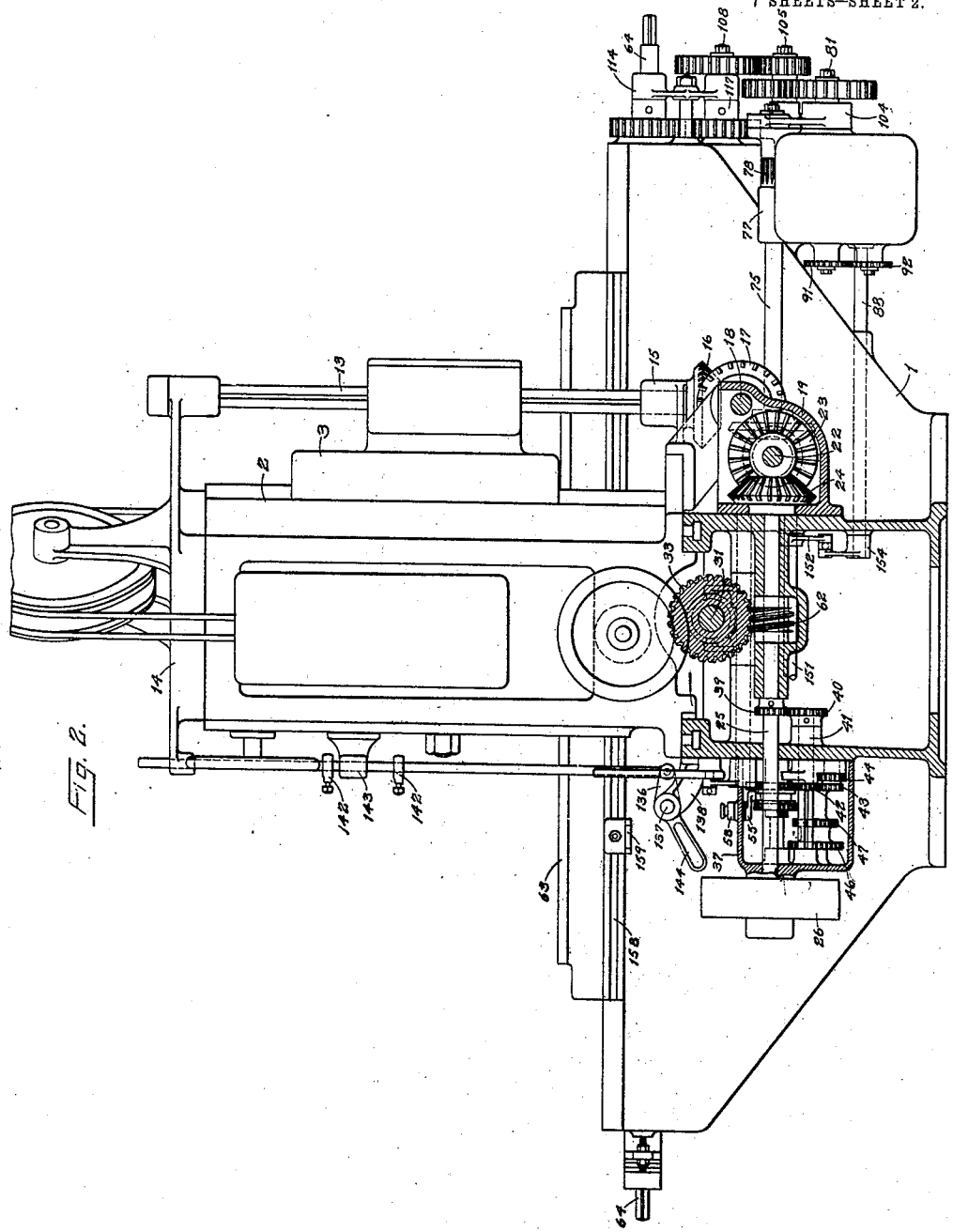
Figure 3:
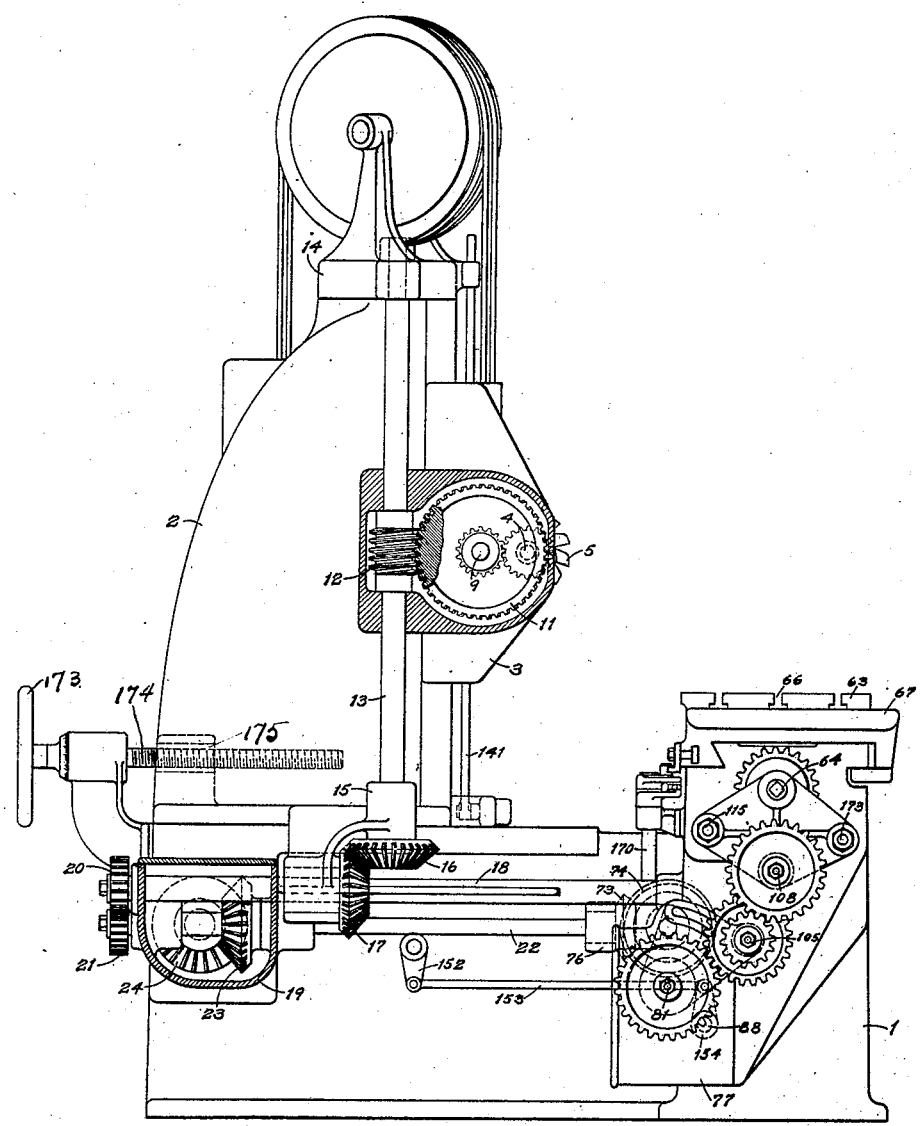

In the drawings Figure 1 is a plan view of the invention with a portion of the framing broken away to more clearly illustrate the cutter feed and return mechanism, Fig. 2 is a rear end elevation, showing a section through X X of Fig. 1, Fig. 3 is a side elevation illustrating the cutter driving mechanism, with the casing broken away in places to readily show the interior, this view also shows the indexing change gears; Fig. 4 is a partial side elevation of the cutter feed and return mechanism, and the lever arrangement for controlling the various functions of the machine; Fig. 5 is a sectional view of the indexing mechanism at Z, Z', Z² and Z³ of Fig. 6, the latter being an end sectional view of Fig. 5 at Y, Y', Y² and Y³; Fig. 7 is an isometric view of the indexing latch; and Figs. 8 to 13, inclusive, show the arrangement to cut diametral, circular, module and millimeter pitches with one index screw; Fig. 16 is a side elevation of the lever arrangement, and Figs. 14 and 15 are plan views of the same; Figs. 17 and 18 are end elevations of the levers, and Fig. 19 is a section at $a\ a'$ of Fig. 16.

Referring especially to Figs. 1, 2 and 3, the frame 1 is of T-shaped construction with a stanchion or upright 2 adjustably mounted upon the stem end of same. The said stanchion 2 is adjusted toward or away from the work table 63 by means of a graduated hand-wheel 173 which is secured to the adjusting screw 174 that engages a threaded portion 175 in the stanchion 2. The stanchion 2 has vertical guideways facing the long end of the frame 1, upon which the cutter carriage 3 is mounted, to reciprocate; the cutter carriage 3 is provided with a cutter spindle 4 rotatably mounted therein, to which the cutters 5 are secured to rotate therewith. The cutter spindle 4 has secured thereon two helical gears with their helices in opposite directions to equalize the strains, the left hand helical gear 6 is attached close to the cutters 5, and is preferably in one piece with the spindle 4, the right hand gear 7 is keyed to outer end of the spindle 4 and is driven by the helical gear 8 which is secured to the shaft 9. The shaft 9 has secured to its other end the helical gear 10 which drives the left hand helical gear 6. The arrangement of helical gears eliminates the objectionable end thrust characteristic of helical gears when arranged in parallel drives, and also provides a powerful cutter drive, which has always been a difficult problem to solve in rack cutting machines, due to the fact that the diameter of the cutter spindle gears are limited to the diameter of the cutter minus twice the depth of the space to be cut. The shaft 9 has also keyed thereto the worm wheel 11 which is driven by the worm 12 splined to the vertical shaft 13, thus giving motion to the shaft 9 and then to the cutter spindle 4 through the helical gears.

The worm 12 is keyed to the vertical shaft 13 to rotate therewith and allow of a vertical adjustment thereon. The vertical splined shaft 13 is arranged in a bearing in the stanchion cap 14 at its upper end, and in the bracket 15 at the lower end. Upon the lower end of said shaft 13 is secured a bevel gear 16 driven by the sleeve bevel gear 17; both gears are carried by the bracket 15 secured to the stanchion 2. The sleeve bevel gear 17 is slidably keyed to the horizontal cutter drive shaft 18 and rotates therewith. The horizontal shaft 18 is splined and has a bearing at one end in the main frame 1, and the other end is supported by the bevel gear bracket 19, and has keyed thereto a change gear 20 which is engaged with a second change gear 21 keyed to the horizontal shaft 22. The change gears 20 and 21 are used to vary the rotations of the cutters. The horizontal shaft 22 has secured thereto a bevel gear 23 driven by the bevel gear 24 secured to the main driving shaft 25, passing across the stem end of the main frame 1, and having secured to its other end the pulley 26, driving the entire mechanism.

Referring now to Fig. 4, the cutter carriage 3 is mounted upon suitable guideways of the stanchion 2, and is reciprocated by means of a screw 27 engaging with the nut 28, secured in the cutter carriage 3. The screw 27 has a bearing at the upper end in the stanchion cap 14, and at the lower end is keyed a bevel gear 29 driven by a sleeve bevel gear 30 slidably keyed upon the horizontal feed driving shaft 31 and carried by a bearing in the stanchion 2. The horizontal feed driving shaft 31 passes through the entire length of the stem end of the main frame with bearings at each end. Loosely mounted on one end of said feed driving shaft 31 is the cutter feed and return mechanism consisting of the feed worm wheel 32 and return worm wheel 33 both rotatably mounted in suitable bearings of the main frame and arranged to rotate in opposite directions. The opposing faces of said worm wheels 32 and 33 are provided with clutch teeth 34 and 35 respectively which are arranged to be alternately engaged by the reversing clutch member 36. The clutch 36 is slidably keyed to the feed driving shaft 31 and rotates therewith in either direction when engaging either the feed or return worm wheels 32 or 33.

The feed worm wheel 32 receives its motion from the main driving shaft 25 through the variable gear box 37 to the feed worm and shaft 38, which are preferably made in one piece, the said feed worm 38 engaging with the wheel 32.

The variable feed gear box 37 consists of a gear 39 secured to the main driving shaft 25, and driving a second gear 40 keyed to the feed tumbler shaft 41. Upon said shaft 41 is splined a feed tumbler pinion 42, arranged to rotate therewith and carried by the tumbler lever 45. The tumbler pinion 42 engages with a tumbler intermediate gear 43, which is secured to a second intermediate gear 44. Both gears 43 and 44 are rotatably mounted in said tumbler lever 45 and arranged to rotate about the tumbler shaft 41 as a center, and can be laterally adjusted so as to individually engage the intermediate series of diversely sized gears 46, 47 and 48 which are preferably in one piece and loosely mounted on the intermediate shaft 49. Upon the feed worm shaft 38 is arranged a second series of diversely sized gears 50, 51 and 52 in an inverse relation to the intermediate series 46, 47 and 48, and, also preferably made in one piece.

The second, or driven series of diversely sized gears 50, 51 and 52 are slidably keyed to the feed worm shaft 38 and are laterally adjusted to engage with the intermediate series 46, 47 and 48 respectively, by means of a lever 53 arranged on the outside of the box 37 with its fulcrum at 54, projecting through the box 37 and having attached to its inner end another lever 55 engaging a circular groove 56 in said driven series of gears, 50, 51 and 52.

The rotary and lateral adjustments of the tumbler gears 42, 43 and 44 to individually engage each of the said gears 43 and 44 with each of the intermediate series 46, 47 and 48, are obtained by the tumbler lever 45, which is locked in each of its adjusted positions by the locking lever 57 hinged in the tumbler lever 45 at 58. In the other end of the locking lever 57 is arranged a pin 60 which engages the holes provided in the box 37 for the various positions, and is held in place by the spring 61 as is customary in many variable speed devices.

The return worm wheel 33 receives its motion directly from the main shaft 25 through the return worm 62 keyed thereto and rotating therewith.

The operation of the reversing clutch 36 will be hereinafter fully explained in connection with the motion controlling devices. The work table 63 upon which the racks to be cut are secured and spaced thereby, is arranged to slide longitudinally upon guideways on the long end of the main frame 1, by means of the indexing screw 64 engaging the nut 65 secured to the table 63. The table 63 is arranged with a series of T slots 66, by which the work may be securely fastened thereon. A trough 67 to receive the overflow lubricant is also provided around the other edge. The indexing screw 64 has a bearing at one end in the bushing 68 which is located in the frame 1, and is arranged to be adjusted in the direction of its length by means of the studs 69 and check nuts 70. The screw 64 has a collar secured on each side of the bushing 68 to act as abutments for adjusting the screw 64 with the bushing 68, thereby adjusting the table in a longitudinal direction. This adjustment is employed to reset racks that have been cut, for a recut, or to position the work accurately to commence cutting at a predetermined point. The other end of the feed screw 64 has a bearing in the frame proper, and is rotated by means of change wheels hereinafter more fully described. The indexing mechanism to move the table 63 and the work thereon, the proper distance for spacing the teeth, is driven from the horizontal shaft 22 which receives its motion directly from the main driving shaft 25 through the bevel gears 23 and 24. Slidably keyed to one end of the horizontal shaft 22 is a clutch 72 arranged to engage the bevel gear 73, loosely mounted on said shaft 22 and rotating in the bracket 76 and driving a second bevel gear 74 secured to the index driving shaft 75 which also has a bearing in the bracket 76 and is journaled at the other end in the index casing 77.

Referring to Figs. 5, 6 and 7, secured to the end of the index driving shaft 75 is a pinion 78 engaging the driven gear 79 loosely mounted on, and concentric with the clutch disk 80; the said clutch disk 80 is secured to the index shaft 81. The flange 82 is secured to the clutch disk 80 and retains the driven gear 79. Rotatably mounted within said clutch disk 80, and at a distance from the center is a latch 83, having a portion of its shank cut away at 84 equal in width to the driven gear 79, to allow the said driven gear 79 to revolve freely upon the clutch disk 80. The clutch disk 80 has a depression upon its face, the sides of which form the abutments 172 for the latch 83. The driven gear 79 has a series of concave recesses 85 to engage with the latch 83. The clutch disk 80 is held stationary by means of the indexing lever 86 holding the latch 83 disengaged from the recesses 85 in the driven gear 79, and thereby holding the index shaft 81 stationary. By withdrawing the indexing lever 86, the latch 83 is released, and the spring 87 draws the latch 83 forward until it strikes the forward abutment 172. This brings the cut away portion 84 of the latch 83 within the path of one of the recesses 85, and thus positively couples the constantly rotating index driving shaft 75 with the index shaft 81, giving said index shaft 81 motion at any desired intervals. The indexing lever 86 is secured to a rock shaft 88 passing through the frame 1 and connected at its other end to the motion controlling mechanism hereinafter more fully described. The indexing lever 86 is held in its operative or inoperative position by a spring controlled plunger 89 operating in the spaces 90 provided in the casing 77.

To control the number of rotations of the index shaft 81 or to time the uncoupling of said shaft 81 from the constantly rotating shaft 75 a positive mechanism is shown, which consists of a change gear 91 secured to the end of the index shaft 81, and engaging with a second change gear 92 keyed to the end of a shaft 93, which projects to the inner side of the box 77. Upon the inner end of said shaft 93 is secured a gear 94 engaging the gear 95, which is preferably in one piece with the gear 96, both being loosely mounted on the index shaft 81, or any other suitable stud. The gear 96 engages with the sleeve gear 97 loosely mounted upon the shaft 93, and said gear 97 has secured thereto a series of cams 98, each having a different number of lobes. The cams 98 control the index lever 86, by means of a sliding cam piece 99, sliding longitudinally in the lever 86, and adapted to engage with either of the cams 98, when it is desired to intermittently rotate the index shaft 81, or it does not engage with any of the cams 98 when continuous motion of the index shaft 81 is desired. The operation of this portion of the mechanism is as follows: The index driving shaft 75 is a constantly rotating shaft, receiving its motion from the pulley 26, as described, with a pinion 78 secured thereto and constantly driving the clutch gear 79. When the lever 86 is withdrawn from the latch 83 the spring 87 draws the said latch 83 forward until it strikes the forward abutment 172 in the clutch disk 80. The latch 83 thus engages the next approaching recess 85 in the driven gear 79 and positively couples the index shaft 81 with the index driving shaft 75. The change gear 91 receives its motion from the index shaft 81 and engages the change gear 92 thereby rotating the shaft 93 to which it is secured, and the gear 94 also secured to the shaft 93. The gear 94 transmits motion to the double gears 95 and 96 loosely mounted on the index shaft 81, the gear 96 rotating the sleeve gear 97, to which the cams 98 are secured; both the cams 98 and sleeve gear 97 rotate loosely on the shaft 93.

Assuming the sliding cam piece 99 in the path of the cam having four lobes, the structure as shown being with one, two and four-lobed cams, and the ratio of gearing 94, 95, 96 and 97 being as 1 is to 4, and the change gears 91 and 92 as 1 to 1, the lever 86 will be forced into the path of the latch 83 just before the index shaft 81 completes its first rotation, thus making only one complete rotation of the shaft 81 for each time the lever 86 is rocked to release the latch 83. The sliding cam piece 99 has the number of lobes marked thereon to indicate the proper position of same to engage any cam. By moving the cam piece 99 into the path of the cam having two lobes, and the change gears 91 and 92 remaining the same ratio, the index shaft 81 will make two rotations between the coupling and uncoupling of the clutch disk 80. When the cam piece is in the path of the one-lobed cam, the number of rotations will be four. By changing the gears 91 and 92 to make a ratio equal to 1 to 2, the index shaft would make 2, 4 and 8 rotations respectively, and a ratio of 1 to 3 would give 3, 6 and 12, etc. The cams 98 must have lobes whose numbers are factors of the ratio of gearing 91, 92, 93 and 94, so as to make complete rotations of index shaft 81 before the uncoupling of the latch 83.

Referring to Figs. 8 to 13, upon the end of the index shaft 81 is keyed a change wheel 100, which engages with a change wheel 101 direct, or at times they are connected by an intermediate gear 102 as shown in Fig. 13, this arrangement is merely a means to reverse the direction of motion. The intermediate gear 102 revolves loosely upon a stud 103 secured to a swinging shoe 104, which is arranged to rotate about the index shaft 81 as a center, and also carries a compound stud 105 upon which are rotatably mounted the gears 101 and 106, the latter engaging with the gear 107 keyed to the index stud 108. The index stud 108 is connected to the index screw 64 in the various ways shown in Figs. 8, 10, 11 and 13. Referring particularly to Fig. 8, which shows the gears 110 and 111 of equal numbers of teeth, and since the index screw 64 is preferably made of a linear pitch equal to .52359877, or 6 diametral pitch, the arrangement as shown in Fig. 8 is applicable to diametral pitch divisions. The different divisions and directions of same being arranged by the change wheels, 100, 102, 101, 106 and 107.

To arrange the machine to index for the equal circular pitches the outer support 114 is removed from the studs 115 and 173 and the equal sized gears 110 and 111 are replaced by the gears 112 and 113, as shown in Fig. 10, whose numbers of teeth are 53 and 37 respectively. Multiplying the linear pitch of the screw, .52359877 by the ratio $\frac{53}{37}$ a constant gearing ratio of .7500073 pitch, or approximately ¾ circular pitch is obtained, which constitutes a total error of .001168 long in ten feet, and can be neglected for all practical purposes. The various circular pitches can then be obtained by the change wheels as described above.

Fig. 11 illustrates the arrangement for millimeter pitches and is accomplished by compound gearing between the index stud 108 and screw 64, the stud 115 being used to carry the compound gears 118 and 119. The gears consist of gear 116 secured to the index stud 108, and placed where the collar 117 was located in Fig. 9, the collar 117 having been located as shown in Fig. 12. The gear 116 engages with one of the compound gears 118, the other compound gear 119 engages with the gear 120 secured to the index screw 164. The numbers of teeth are 43, 61, 64 and 40 respectively, beginning with the gear 116. The constant ratio becomes $$\frac{43}{61} \times \frac{64}{40} \times .52359877 = .5905507$$

linear pitch, which is equal to 15 m/m pitch, with an error of .00072 inches long in ten feet.

For module pitches the arrangement is as shown in Fig. 13, in which the stud 173 is employed to carry the compound gears 122 and 123. The gear 121 secured to the index stud 108 engages with the gear 122, and the compound gear 123, engages with the gear 124 secured to the index screw 64. The constant ratio thus obtained is $$\frac{44}{52} \times \frac{67}{40} \times .52359877 = .74210056$$

linear pitch or 6 module pitch with an error of .000432 inches long in ten feet.

The arrangement described constitutes a practical way to overcome the difficulty of using several screws, being both rigid and accurate. The device has also the advantage that the same change gears can be used for the various diametral and module pitches commonly used, and also the circular and millimeter pitches, but differently arranged. With ten different change gears, all the pitches commonly used can be obtained in any of the above denominations.

The various movements, such as the feeding and returning of the cutters 5, and the indexing of the work that may be secured to the table 63, are automatically controlled and interlocked by a series of levers and connecting rods now to be described, reference being had particularly to Figs. 14 to 19 inclusive.

The reversing clutch 36 shown in Fig. 16 is slidably keyed to the feed driving shaft 31 and alternately engages the feed worm wheel 32 and the return worm wheel 33 to feed and return the cutters 5 across the work. The clutch 36 is operated by a rock lever 125 engaging a peripheral groove 109 in said clutch 36. The rock lever 125 is secured to a rock shaft 126 which has secured at its outer end a second lever 127, to which is attached a connecting rod 128 having its other end attached to a reversing lever 129. The reversing lever 129 is operated by a lost motion lever 130, both levers 129 and 130 rocking on the same stud 131. Two abutments 132 are provided on the lost motion lever 130, between which the one end of the reversing lever 129 is located and operated thereby. A wedge-shaped spring plunger 133 is provided at right angles to the abutments 132 and operates according to the inclines on 134. A connecting rod 135 is connected to the plunger end of the lost motion lever 130, and extends upward to the lever 136, which is secured to a horizontal rock shaft 137 mounted in bearings 138 at either end of same. Upon the rock shaft 137 is slidably keyed a lever 139 carried by two bearings 140, attached to the stanchion 2, and connected to the cutter slide 3 by means of the trip rod 141, which has one end guided by the stanchion cap 14 (see Fig. 2). Upon the trip rod 141 are mounted two adjustable dogs 142, which can be adjusted for the required length of stroke, and are operated by the abutment 143 secured to the cutter slide 3. The functions of the levers thus explained are to automatically feed and return the cutter slide, the operation being as follows: The cutter slide 3 feeds downward until it strikes the lower dog 142 thereby forcing the trip rod 141 and the levers 139 and 136 downward, which in turn forces the lost motion lever by means of the rod 135, past the high point of the incline 134. As soon as the high point of the incline 134 has been passed, the spring pressed plunger 133 advances down the incline, thus forcing the reversing clutch 36 rapidly away from the feed worm wheel 32, and into engagement with the return worm wheel 33. The space between the abutment 132 and the face of the reversing lever 129 is equal to the distance required for the spring plunger 133 to move across the highest point on the incline after which the spring operates the levers 130, 129 127 and 125, whereby the reversing clutch 36 is rapidly withdrawn, causing very little wear upon the clutch teeth. The cutter slide then moves upward on its return stroke until it strikes the upper dog, when the motions are reversed, and the slide again advances downward. These motions can also be effected manually by handle 144 on the lever 136. However, before the cutter slide again commences to feed, the index is set in motion. This is accomplished by an arm 145, on the opposite end of the lever 130 from the abutments 132, said arm 145 having attached thereto a hook 146, which draws back when the lost motion plunger 133 is forced downward, thus allowing the hook part 147 to engage with a complementary hook shaped lever 148, and the same is forced in place by the spring 149 in the bracket 150 which guides one end of the hook 146. When the slide returns and strikes the upper dog, the hook 146 is pushed forward, and thereby the lever 148, until the incline on the bracket 150 separates the hook 146 from said lever 148. The lever 148 having been thus rocked, and with it the shaft 151 to which it is secured, and the lever 152 attached to the other end of the rock shaft 151, the index lever 86 is rocked by means of the connecting rod 153 and the lever 154 secured to the rock shaft 88. The indexing lever 86 is secured to the rock shaft 88. The latch 83 is then allowed to be forced into engagement, until the lever 86 is again rocked, by means of the cams, to disengage it, as hereinbefore described.

During the period of indexing, the reversing clutch 36 has been maintained in a central or inoperative position, thereby holding the cutter slide 3 stationary until the completion of the indexing; this is obtained by the arm 155 on the lever 148, which has a handle 176 for manual operation. When the lever 148 is rocked by the hook 146, the arm 155 is forced into the path of the lower end 156 of the reverse lever 129, thereby holding the reverse lever 129 and the reverse clutch 36 central, until the upward movement of the arm 155, allows the spring plunger 133 to force the reverse clutch 36 into engagement with the feed worm wheel. The positions of the levers in Fig. 16 are shown at this point, and are being held so, by the stop handle 157 which engages a pin on the lever 127. The moment the stop handle 157 is rocked to disengage from the lever 127, the reverse clutch 36 is forced toward the feed side. The end 156 is also arranged so that when the feed is engaged, the index cannot be started by raising the lever 148 by means of the handle 176. It can readily be seen that when the reverse lever 129 is in its feed position, the lower end 156 is in the path of the arm 155, and does not allow of any downward movement.

The arrangement of levers thus far described controls automatically the feeding and returning of the cutter slide, and the indexing, interlocking each movement until the preceding movement has been completed. A novel arrangement has also been provided whereby the feed can be automatically arrested, and the indexing stopped at any predetermined point. This arrangement is operated by the work table 63, having a T slot 158 provided therein, in which is slidably mounted a double incline 159, arranged to operate a roller 160, and be secured in any predetermined position on the work table. The roller 160 is attached to a lever 161, which has a connecting rod 162 attached to its lower side and extending in either direction parallel with the table 63. The one end of the connecting rod 162 is attached to a rock lever 163, secured to the vertical rock shaft 164 which has another lever 165 secured to its lower end, and is connected to a bell crank lever 166, through a rod 167. The lever 161, with the roller 160, is arranged to rock in one direction only, so as to bring the arm 168 of the bell crank lever 166 in the path of the lost motion lever 130 to arrest the feed until it is again disconnected by the operator. The rocking of the lever 161 is accomplished by the double incline 159 operating in either direction of the table 63. The other end of the rod 162 is attached to a rock lever 169 secured to a vertical rock shaft 170, upon the lower end of which is secured the clutch lever 171 operating the clutch 72, whereby the indexing mechanism is instantly disengaged at any predetermined point on the table 63.

Having described my invention, I claim as new and desire to secure by Letters Patent, the following:

1. The combination with a cutter carriage, of a work supporting table, of a screw, with a fixed lead, to index same, an index shaft, means controlled by said cutter carriage to intermittently rotate said index shaft at desired intervals, a stud, gearing connecting said screw and stud to change the fixed lead of said screw to an integral or fractional unit in any of the common systems of gear tooth measurements in practice, and change gears connecting said index shaft and stud to vary the number of units indexed by said screw in any of the systems.

2. The combination with a cutter carriage, of a work supporting table, of a screw with a diametral pitch lead to index same, and index shaft, means controlled by said cutter carriage to intermittently rotate said index shaft at desired intervals, a stud, gearing connecting said screw and stud to change the lead of said screw to an integral or fractional circular pitch unit of measure and change gears connecting said index shaft and stud to index said work table fractional or multiple parts of said unit of measure.

3. The combination with a cutter carriage, of a work supporting table, of a screw with a diametral pitch lead to index same, and index shaft, means controlled by said cutter carriage to intermittently rotate said index shaft at desired intervals, a stud, a second stud, gearing connecting said screw and studs to change the lead of said screw to an integral or fractional metric pitch unit of measure, and change gears connecting said index shaft and said first stud, to index said work table fractional or multiple parts of said unit of measure.

4. The combination with a cutter carriage, of a work supporting table, of a screw with a diametral pitch lead to index same, an index shaft, means controlled by said cutter carriage to intermittently rotate said index shaft at desired intervals, a stud, a second stud, gearing connecting said screw and studs to change the lead of said screw to an integral or fractional module pitch unit of measure, and change gears connecting said first stud and index shaft to index said work table fractional or multiple parts of said unit of measure.

5. The combination with a work supporting table, of a reciprocating cutter carriage, indexing mechanism operating said table at desired intervals, and means operated by said work table to disconnect said index mechanism at any predetermined point.

6. The combination with a work supporting table, of a reciprocating cutter carriage, indexing mechanism for said table, means controlled by said cutter carriage to set said indexing mechanism in operation at desired intervals, and means controlled by said table to disconnect said indexing mechanism at any predetermined point.

7. The combination, with a work supporting table, of a reciprocating cutter carriage, an indexing mechanism for said table, comprising an indexing disk, a constantly rotating driving shaft, means to couple and uncouple said disk with said driving shaft controlled by said cutter carriage, and means controlled by said table to disconnect said driving shaft from its source of power whereby the indexing is discontinued at any predetermined point.

8. The combination with a work supporting table, of a reciprocating cutter carriage an indexing mechanism for said table, comprising an indexing disk, a constantly rotating driving shaft, a clutch connecting said driving shaft to its source of power, means to couple and uncouple said disk with said driving shaft controlled by said cutter carriage, and means controlled by said table, operating said clutch to disconnect said shaft from its source of power, whereby the indexing is discontinued at any predetermined point.

9. The combination with a work supporting table, of indexing mechanism therefor, a cutter carriage, feeding and retracting mechanism therefor, comprising two oppositely rotating driving members, a clutch, means to alternately connect said clutch with said driving member to feed and retract said carriage and means to index said work table when said carriage is retracted with means to hold said carriage stationary during said indexing, and means controlled by said table to disconnect said indexing mechanism at any predetermined time.

10. The combination with a work supporting table, of indexing mechanism therefor, a cutter carriage, feeding and retracting mechanism therefor, means to index said table when said carriage is retracted with means controlled by said table to disconnect said indexing at any predetermined time, and holding said carriage in its retracted position, whereby the machine becomes substantially inoperative.

11. The combination with a work supporting table of indexing mechanism therefor, a cutter carriage, feeding and retracting mechanism therefor, means to index said table when said carriage is retracted with means controlled by said table to disconnect said indexing at any predetermined point.

12. The combination with a work supporting table, of an indexing mechanism therefor, a cutter carriage, feeding and retracting mechanism therefor, a reversing clutch controlled by said cutter carriage to alternately connect said feeding and retracting mechanism to said cutter carriage, means controlled by said work table to maintain said reversing clutch in a neutral or inoperative position and to disconnect said indexing mechanism at any predetermined point.

13. The combination with a cutter carriage, of a feeding and retracting mechanism therefor, a spring pressed reversing lever connected to and operated by said cutter carriage to alternately connect said feeding and retracting mechanism to said cutter carriage, a stop therefor, a work support, an index shaft connected therewith, an indexing clutch, an indexing lever to couple and uncouple said clutch and index shaft, connections between said reversing and indexing levers to couple said clutch and index shaft when cutter carriage is retracted, other connections between said indexing lever and stop for said reversing lever to maintain said carriage in a retracted position during the indexing movement, and means to disconnect said indexing mechanism controlled by said work support.

WILLIAM F. ZIMMERMANN.

Witnesses:
BENJAMIN NITTINGER,
EDWIN C. THURSTON.

---

Copies of this patent may be obtained for five cents each, by addressing the "Commissioner of Patents, Washington, D. C."